United States Patent
Baker et al.

(10) Patent No.: US 7,166,557 B2
(45) Date of Patent: Jan. 23, 2007

(54) PROCESS FOR THE PREPARATION OF A MICROSPHEROIDAL CATALYST

(75) Inventors: Michael James Baker, Feltham (GB); Peter Johnston, Royston (GB); Dennis Murphy, Newmarket (GB)

(73) Assignees: BP Chemicals Limited, Middlesex (GB); Johnson Matthey PLC, London (GB)

( * ) Notice: Subject to any disclaimer, the term of this patent is extended or adjusted under 35 U.S.C. 154(b) by 0 days.

(21) Appl. No.: 10/502,299

(22) PCT Filed: Dec. 18, 2002

(86) PCT No.: PCT/GB02/05761

§ 371 (c)(1),
(2), (4) Date: Jul. 22, 2004

(87) PCT Pub. No.: WO03/061829

PCT Pub. Date: Jul. 31, 2003

(65) Prior Publication Data

US 2005/0032638 A1    Feb. 10, 2005

(30) Foreign Application Priority Data

Jan. 22, 2002 (GB) ............................. 0201378.7

(51) Int. Cl.
| B01J 23/58 | (2006.01) |
| B01J 23/00 | (2006.01) |
| B01J 23/40 | (2006.01) |
| B01J 23/72 | (2006.01) |
| B01J 23/42 | (2006.01) |

(52) U.S. Cl. ............... 502/330; 502/325; 502/327; 502/328; 502/331; 502/332; 502/333; 502/339; 502/527.12; 502/527.13

(58) Field of Classification Search ............... 502/325, 502/327, 328, 330–333, 339, 527.12, 502.13
See application file for complete search history.

(56) References Cited

U.S. PATENT DOCUMENTS 3,743,607 A * 7/1973 Sennewald et al. ......... 502/170
4,801,573 A   1/1989 Eri et al.
5,179,056 A * 1/1993 Bartley ..................... 502/170
5,189,004 A * 2/1993 Bartley ..................... 502/170
5,466,652 A * 11/1995 Paparizos et al. .......... 502/330
5,674,800 A * 10/1997 Abel et al. ................. 502/326
5,783,726 A * 7/1998 Lemanski et al. .......... 560/261
6,395,676 B1 * 5/2002 Blum et al. ................ 502/330
6,399,813 B1 * 6/2002 Blum et al. ................ 560/245
6,528,453 B1 * 3/2003 Baker et al. ............... 502/325
6,534,438 B1 * 3/2003 Baker et al. ............... 502/325
6,806,382 B1 * 10/2004 Baker et al. ............... 560/245
6,849,243 B1 * 2/2005 Hagemeyer et al. ........ 423/344

FOREIGN PATENT DOCUMENTS

| DE | 31 19 707 A1 | 12/1982 |
| EP | 0 672 453 A2 | 9/1995 |
| GB | 1 250 265 A | 10/1971 |
| GB | 1 266 623 A | 3/1972 |
| GB | 1 314 225 A | 4/1973 |

* cited by examiner

Primary Examiner—J. A. Lorengo
Assistant Examiner—Patricia L. Hailey
(74) Attorney, Agent, or Firm—Nixon & Vanderhye

(57) ABSTRACT

Process for preparing a catalyst active for the fluid bed acetoxylation of ethylene to produce vinyl acetate. The process comprises the steps of (a) impregnating microspheroidal silica support particles by the incipient wetness technique with an aqueous solution of palladium and gold compounds, whilst agitating the support particles; (b) drying the impregnated support particles produced in step (a) whilst agitating the impregnated support particles; (c) reducing the palladium and gold compounds of the impregnated support particles produced in step (b) to respective metals by adding the dried, impregnated support particles to an aqueous solution of hydrazine, whilst stirring, to form a slurry; (d) filtration of the slurry produced in step (c) to remove the excess reduction solution; (e) washing the filter cake/slurry produced in step (d) with water and removing excess water to form a cake; (f) impregnating the cake produced in step (e) with one or more salts of Group I, Group II, lanthanide and transition metals by blending the cake produced in step (e) with one or more solid salts of Group I, Group II, lanthanide and transition metals; and (g) drying the impregnated cake produced in step (f) whilst agitating the impregnated cake to form free-flowing catalyst particles.

33 Claims, No Drawings

PROCESS FOR THE PREPARATION OF A MICROSPHEROIDAL CATALYST

This application is the U.S. National Phase of International Application PCT/GB02/5761, filed 18 Dec. 2002, which designated the U.S.

The present invention relates to a process for preparing a catalyst active for the fluid bed acetoxylation of ethylene to produce vinyl acetate and to generally applicable aspects of such a process.

BACKGROUND OF THE INVENTION

The process for preparing catalysts active for the acetoxylation of ethylene to produce vinyl acetate are known for example from European patent publication EP-A-0672453 which relates to a process for the preparation of a fluid bed catalyst comprising impregnating a support comprising a mixture of substantially inert microspheroidal particles with a solution comprising salts of palladium and a metal M selected from the group consisting of barium, gold, lanthanum, niobium, cerium, zirconium, lead, calcium, strontium, antimony and mixtures thereof. EP-A-0672453 describes preparation processes in which metal salt compounds are reduced using hydrazine.

Several processes are described for the treatment of hydrazine containing aqueous streams. These involve decomposition of hydrazine with an oxidising agent in the presence of a noble metal or base metal catalyst (e.g. JP 2000107774, JP 63205194, JP 63036894). This oxidative decomposition may also be performed in the presence of alkali (e.g. JP 63049295). In the absence of an oxidant hydrazine is readily decomposed either thermally or in the presence of a catalyst to nitrogen and/or ammonia.

DESCRIPTION OF THE INVENTION

Processes for the preparation of catalysts for the fixed bed production of vinyl acetate are well established and described in the patent and scientific literature. There remains a need for an improved process for the commercial scale preparation of a catalyst active for the fluid bed acetoxylation of ethylene to produce vinyl acetate. This invention provides an integrated process for the production of a fluid bed catalyst for this process.

According to one aspect of the present invention there is provided a process for preparing a catalyst active for the fluid bed acetoxylation of ethylene to produce vinyl acetate, which process comprises the steps of:

(a) impregnating microspheroidal silica support particles by the incipient wetness technique with an aqueous solution of palladium and gold compounds, whilst agitating, preferably continuously agitating, the support particles;

(b) drying the impregnated support particles produced in step (a) whilst agitating the impregnated support particles;

(c) reducing the palladium and gold compounds of the impregnated support particles produced in step (b) to respective metals by adding the dried, impregnated support particles to an aqueous solution of hydrazine, whilst stirring, to form a slurry;

(d) filtration of the slurry produced in step (c) to remove the excess reduction solution;

(e) washing the filter cake/slurry produced in step (d) with water and removing excess water to form a cake;

(f) impregnating the cake produced in step (e) with one or more salts of Group I, Group II, lanthanide and transition metals by blending the cake produced in step (e) with one or more solid salts of Group I, Group II, lanthanide and transition metals; and (g) drying the impregnated cake produced in step (f) whilst agitating the impregnated cake to form free-flowing catalyst particles.

The present invention provides a process which is integrated and has several advantages that are particularly suited to the production of a microspheroidal catalyst.

Thus, impregnation of the microspheroidal particles by the incipient wetness technique whilst agitating the support has been found to be an effective way of providing relatively uniform impregnation. By use of a vessel capable of being heated and agitated simultaneously, advantageously the subsequent drying stage can be performed using the same apparatus. This has advantages of reducing the handling of the material and controlling the location and distribution of the impregnated precursor metal salts.

Thus, according to a further embodiment of the present invention there is provided a process for impregnating microspheroidal catalyst support particles with at least one compound of a catalytically active metal, which process comprises the steps of:

(a') impregnating the microspheroidal support particles by the incipient wetness technique with an aqueous solution of the at least one catalytically active metal, whilst agitating the support particles; and (b') drying the impregnated support particles produced in step (a') whilst agitating the impregnated support particles.

In the processes of the present invention, the microspheroidal support particles are suitably selected from the group consisting of inorganic oxides such as silica, alumina, zirconia and mixtures thereof, preferably silica. The microspheroidal support particles are preferably resistant to attrition during agitation in the processes of the present invention.

Suitable support particles have a distribution of larger to smaller particle sizes. Typically, at least 80% and preferably at least 90% of the support particles have mean diameters of less than about 300 microns.

A typical catalyst useful in the present invention may have the following particle size distribution:

| | |
|---|---|
| 0 to 20 microns | 0–30 wt % |
| 20 to 44 microns | 0–60 wt % |
| 44 to 88 microns | 10–80 wt % |
| 88 to 106 microns | 0–80 wt % |
| >106 microns | 0–40 wt % |
| >300 microns | 0–5 wt % |

Persons skilled in the art will recognize that support particles sizes of 44, 88, and 300 microns are arbitrary measures in that they are based on standard sieve sizes. Particle sizes and particle size distributions may be measured by an automated laser device such as a Microtrac X100.

Microspheroidal support particles useful in the present invention are sufficiently porous to permit gaseous reactants to diffuse into the particle and contact catalytic sites incorporated within the particle. Thus, the pore volume should be high enough to permit gaseous diffusion. However, a support particle with an exceedingly high pore volume typically will not have sufficient attrition resistance or will not have sufficient surface area for catalytic activity. A typically suitable microspheroidal support particle has a pore volume (measured by nitrogen sorption) between about 0.2 and 0.7 cc/g. A preferable support particle has a pore volume between about 0.3 and 0.65 cc/g and more preferably between about 0.4 and 0.55 cc/g.

Surface areas (measured by nitrogen BET) for support particles with mean diameters and pore volumes useful in the present invention typically are above about 50 m2/g and may range up to about 200 m2/g. A typical measured surface area is about 60 to about 125 m2/g.

Typically useful support particles, especially silica support particles are described in U.S. Pat. No. 5,591,688, incorporated by reference herein. In these supports microspheroidal particles are produced by spray drying a mixture of a silica sol with silica particles followed by drying and calcining. In the preparation, at least 10 wt. %, preferably at least 50 wt. %, of a silica sol is mixed with particulate silica. A useful particulate silica is a fumed silica such as Aerosil® (Degussa Chemical Company). A typical silica particulate material has a high surface area (about 200 m2/g) with essentially no micropores, and, typically, are aggregates (with mean diameters of several hundred nm) of individual particles with average diameters of about 10 nm (above 7 nm). Preferably, the silica is sodium free. Sufficient particulate silica is added to the mixture to obtain a desired pore volume in the resulting support particle. The amount of particulate silica may range up to 90 wt. % and typically ranges up to 10 to 50 wt. % of the silica in the mixture. Typically, the silica sol/particulate silica mixture is spray dried at an elevated temperature such as between 115° to 280° C., preferably 130° to 240° C., followed by calcining at temperature typically ranging from between 550° to 700° and, preferably 600° to 660° C.

An advantageous silica sol for preparing a catalyst support useful in the present invention contains silica particles in the sol typically more than 20 nanometers in mean diameter and may be up to about 100 nanometers or more. Preferable sols contain silica particles of about 40 to 80 nanometers. Nalco silica sol 1060 particularly is advantageous because of the relatively large mean silica particle sizes of 60 nm pack less efficiently than smaller sol particles such as Nalco 2327 at about 20 nm. The larger particle size so yields a final support with higher mesopore volume and less micropore volume.

In the processes of the present invention the particulate support particles are impregnated with at least one compound of a catalytically active metal. Preferably, the catalytically active metal comprises at least one Group VIII noble metal. The noble metals of Group VIII of the Periodic Table of the Elements (IUPAC) are palladium, platinum, rhodium, ruthenium, osmium and iridium. Typically, the noble metal used in a process according to the present invention for preparing a catalyst active for the acetoxylation of ethylene to produce vinyl acetate comprises palladium. Such a catalyst typically contains at least about 0.1%, preferably at least 0.2 wt % palladium to about 5 wt % and preferably up to 4 wt % palladium.

In the processes of the present invention the microspheroidal support particles are impregnated by the incipient wetness technique. In this technique the support is contacted with a solution of the compounds to be impregnated in an amount which is from 60 to 120% of the pore volume of the support particles, preferably from 70 to 100% of the pore volume. Suitable solvents may be water, carboxylic acids such as acetic acid, benzene, toluene, alcohols such as methanol or ethanol, nitrites such as acetonitrile or benzonitrile, tetrahydrofuran or chlorinated solvents such as dichloromethane. Preferably, the solvent is water and/or acetic acid. Suitably, and especially when the present invention is used for the preparation of a catalyst active for the acetoxylation of ethylene to produce vinyl acetate, the support particles are impregnated with palladium acetate, sulphate, nitrate, chloride or halogen-containing palladium compounds such as $H_2PdCl_4$, which is sometimes also represented as $[PdCl_2]2HCl$, and Group I or Group II salts thereof such as $Na_2PdCl_4$ and $K_2PdCl_4$. A preferred water soluble compound is $Na_2PdCl_4$. A preferred acetic acid-soluble palladium compound is palladium acetate. The palladium compounds may be prepared in situ from suitable reagents.

The catalyst active for the manufacture of vinyl acetate may also comprise, as promoters, other metals such as gold, copper, cerium and mixtures thereof, preferably gold. These promoters may be used in an amount of 0.1 to 10% by weight of each promoter metal present in the finished catalyst composition. Typically, the weight percent of gold is at least about 0.1 wt %, preferably, at least 0.2 wt % gold to about 3 wt % and preferably up to 2 wt % gold. Typically, the weight percent of cerium is at least about 0.1 wt %, preferably at least 0.2 wt % to about 10 wt % or more, preferably up to 5 wt % of cerium. Typically, the weight percent of copper is at least 0.1 to about 10 wt %, preferably up to 5 wt % copper.

Suitable gold compounds which may be used include gold chloride, dimethyl gold acetate, barium acetoaurate, gold acetate, tetrachloroauric acid ($HAuCl_4$, sometimes represented as $AuCl_3.HCl$) and Group I and Group II salts of tetrachloroauric acid such as $NaAuCl_4$ and $KAuCl_4$. Preferably, the gold compound is $HAuCl_4$. The gold compounds may be prepared in situ from suitable reagents.

The agitation of the support particles during the incipient wetness impregnation step and during the subsequent drying step may be performed in an agitated blender such as ribbon, ploughshare, V-type. This has an advantage that the same apparatus may be used for both steps.

Preferably, the drying of impregnated particles is performed by agitating the support particles whilst applying external heat at a temperature in the range upto 150° C. This achieves rapid drying without redistribution of the metal complexes or precursor salts which has an advantage of avoiding metal migration to give uniformly impregnated material.

Thus, according to a further aspect of the present invention, there is provided a process for drying impregnated microspheroidal catalyst support particles, which process comprises agitating the impregnated support particles whilst applying external heat at a temperature in the range 50 to 200° C., preferably 100 to 150° C.

Dry gas such as air, nitrogen, at room temperature to 200° C. may be passed over and/or through the catalysts during drying. After drying, the support particles impregnated with at least one compound of a catalytically active metal may be contacted with a reducing agent to convert the compound to its respective metal.

Thus, according to yet a further aspect of the present invention there is provided a process for reducing at least one compound of a catalytically active metal impregnated within microspheroidal support particles, to its respective metal, which process comprises adding the impregnated microspheroidal support particles to a solution of a reducing agent active for reduction of the at least one metal compound to its respective metal whilst stirring.

It has been found that addition of the impregnated particles to a solution of a reducing agent rather than addition of the solution of reducing agent to the impregnated support particles has benefits, especially for preparing catalyst active for the acetoxylation of ethylene to produce vinyl acetate in a fluid bed process. In particular, this aspect of the present invention provides a process in which the reducing agent is at a high concentration and excess relative to the compound being reduced throughout the reaction. This has been found to produce a layer structure, which is especially beneficial for preparing a catalyst active for the acetoxylation of vinyl acetate. In this layered structure the support particles have at least one catalytically active metal or precursor thereof distributed therein, in which the metal or precursor thereof is distributed in the support particle in a layer below the surface of said particle, said layer being between an inner and an outer region of said support particle, and each of said inner and outer regions having a lower concentration of said metal or precursor thereof than said layer. This provides an advantage in that the outer layer of the catalyst acts as a protective layer and serves to reduce the loss of metals upon attrition of the particle whilst still maintaining the activity of the catalyst. The outer region of the catalyst composition may also provide some resistance to poisoning of the catalytically active metal.

Preferably the reducing agent active for the reduction of at least one metal compound to its respective metal comprises hydrazine. Preferably the solution of said reducing agent is an aqueous solution of hydrazine, more preferably an aqueous solution of hydrazine that has not been rendered alkaline by an alkali metal hydroxide. Most preferably the solution of said reducing agent consists of hydrazine in aqueous solution in the absence of any other added components. It has surprisingly been found that aqueous hydrazine is active for the reduction of at least one metal compound to its respective metal even when not been rendered alkaline by an alkali metal hydroxide Suitably, at least one compound impregnated in the support comprises palladium and gold compounds and the reducing agent comprises hydrazine in aqueous solution.

Preferably, the concentration of hydrazine in the aqueous solution is 1 to 20 wt %, such as 3 to 20 wt %, for example 5 to 20 wt %.

When hydrazine is used as reducing agent, excess hydrazine may be washed from the support material. During reduction with hydrazine it is beneficial to pass an inert gas such as nitrogen over or through the support particles to remove oxygen (air) from the vessel as well as gaseous products of the reduction, in particular hydrogen and ammonia. Air is not a suitable purge gases as oxygen may result in decomposition of the hydrazine, which being an exothermic reaction can be potentially unsafe.

Unreacted hydrazine washed from the material after the reduction step may be disposed of according to known methods. It has been found that a particularly suitable method of purifying this hydrazine containing aqueous waste stream is to catalytically decompose the hydrazine in the absence of an oxidant over a suitable catalyst to nitrogen and ammonia.

Thus, according to a further aspect of the present invention there is provided a process for the purification of a waste stream comprising dilute aqueous hydrazine, which process comprises contacting the waste stream with a catalyst active for the decomposition of the hydrazine. Preferably, the catalyst active for the decomposition of hydrazine comprises ruthenium on a support. The amount of ruthenium on the support is preferably in the range from 1 to 10% by weight. Preferably, the support is selected from the group consisting of inorganic oxides such as silica, alumina, zirconia and mixtures thereof as well as activated carbon and graphite. Preferably the reaction is performed at temperatures in the range from 0 to 100° C. by circulating the solution through a fixed bed of catalyst. The residence time of the aqueous hydrazine solution within the catalyst bed should preferably be controlled such that the temperature of the solution does not exceed its boiling point, most preferably the solution temperature should be maintained in the temperature range of 70 to 95° C.

In catalyst compositions suitable for the production of vinyl acetate, in addition to Group VIII noble metals such as palladium and optional promoter selected from gold, copper and cerium the support particles may also be impregnated with one or more salts of Group I, Group II, lanthanide and transition metals promoters, preferably of cadmium, barium, potassium, sodium, manganese, antimony, lanthanum or mixtures thereof, which are present in the finished catalyst composition as salts, typically acetates. Generally, potassium will be present. Suitable salts of these compounds are acetates but any soluble salt may be used. These promoters may be used in an amount of 0.1 to 15%, preferably 3 to 9%, by weight of each promoter salt present in the finished catalyst composition. It has been found that these promoter salts may be impregnated by blending support particles with solid salts of the promoter metal in the presence of limited amount of solvent.

Thus, according to a further aspect of the present invention there is provided a process for impregnating porous microspheroidal particles with one or more salts of Group I, Group II, lanthanide and transition metals which process comprises blending the particles with one or more solid salts of Group I, Group II, lanthanide and transition metals in the presence of a solvent for the salt in which the solvent is contained within the pore volume of the catalyst support particle. Preferably the solvent is water.

It has been found that by using a solid salt and catalyst particles containing a limited amount of solvent within the pore volume, the salt is impregnated within the support with a uniform distribution and may be performed using the wet filtered material without the need of drying prior to impregnation with a solution of the salt. Additionally, impregnation of the salt may be performed by blending the wet support with the solid salt in a blender (e.g. ribbon, V-type, ploughshare) which has an advantage that the same apparatus may be used for the subsequent drying of the material.

Preferably, the support impregnated with one or more salts of Group I, Group II, lanthanide and transition metals is dried at a temperature in the range from 60° C. to 150° C.

EXAMPLES

The invention will now be described by reference to the following Examples.

Example 1

Preparation of WD-1.

Silica support (231.75 kg) was impregnated with an aqueous solution of $Na_2PdCl_4$ (containing 4.10 kg palladium) and $HAuCl_4$ (containing 1.65 kg gold) by the incipient wetness technique. The metal salts were dissolved in demineralised water to give an impregnation solution of 124 liters (about 82% of the pore volume of the support particles). The impregnation was performed in a ribbon blender manufactured from Hastalloy C276 alloy.

Thereafter, the material was dried in the ribbon blender by introducing steam into the steam jacket of the blender at a mean wall temperature of 145° C. During the drying, a dry air purge was passed through the blender over the agitated material to remove the evolved moisture.

Thereafter the dried material was cooled to room temperature and the impregnated salts were reduced to metallic state by addition of the solid material to a stirred aqueous solution of hydrazine (946 liters, 5% by weight hydrazine). The resultant slurry was allowed to stand overnight with occasional stirring.

Thereafter, the material was decant washed 4 times with about 800 liters demineralised water in each wash and dewatered using a rotating bowl centrifuge.

The wet material (cake) was blended with solid anhydrous potassium acetate (10 kg) in a ribbon blender and thereafter dried under agitation by introducing steam into the steam jacket of the blender to give a mean wall temperature of 145° C. The evolved moisture was removed with a dry air purge through the blender.

The resulting product was a free-flowing catalyst material suitable for fluid bed acetoxylation of ethylene to produce vinyl acetate.

Example 2

Preparation of 1.3R410.

Silica support (1124 kg) was impregnated with an aqueous solution of $Na_2PdCl_4$ (containing 11.40 kg palladium) and $HAuCl_4$ (containing 4.56 kg gold) by the incipient wetness technique. The metal salts were dissolved in demineralised water to give an impregnation solution of 600 liters. The impregnation was performed in a ribbon blender manufactured from Hastalloy C276 alloy.

Thereafter, the material was dried in the ribbon blender by introducing steam into the steam jacket of the blender to give a mean wall temperature of 120° C. During the drying, a dry air purge was passed through the blender over the agitated material to remove the evolved moisture.

The dried material was cooled to less than 35° C., initially by natural cooling after isolation of the steam supply and thereafter by introducing cooling water into the steam jacket.

Then the impregnated salts were reduced to metallic state by addition of the solid material to a stirred aqueous solution of hydrazine (2200 liters, 5 % by weight hydrazine).

Thereafter, the material was then pumped to a Nutsche pressure filter and filtered under nitrogen. The filter cake was washed 3 times with about 1000 liters of demineralised water in each wash.

The wet material (filter cake) was blended with solid anhydrous potassium acetate (60 kg) in a ribbon blender and thereafter dried under agitation by introducing steam into the steam jacket of the blender to give a mean wall temperature of 120° C. The evolved moisture was removed with a dry air purge through the blender. Drying was stopped when the moisture content of the material was in the range 20 to 25% by weight. The partially dried material was transferred to a fluid bed drier operated at an air inlet temperature of 150° C. to remove the remaining moisture.

The resulting product was a free-flowing catalyst material suitable for fluid bed acetoxylation of ethylene to produce vinyl acetate.

Example 3

Hydrazine Removal by Anaerobic Decomposition Over Ru/Silica

An aqueous hydrazine solution (2400 liters with [N2H4]=1.8 g/l) at a temperature of 66° C. was recirculated through a fixed bed of 2.6% Ru/silica catalyst (Johnson Matthey Type 660) containing 20 Kg catalyst. The flow rate through the catalyst bed was 2.2 l/min. Decomposition of the hydrazine was accompanied by evolution of gaseous products (N2, H2 and NH3) and an increase in the temperature of the solution to 70° C. The solution was recirculated through the catalyst bed for a period of 12 hours. Analysis of the final solution indicated that complete decomposition of the hydrazine had occurred ([N2H4]=<0.1 g/l, [NH4OH]=2.5 g/l).

Example 4

Hydrazine Decomposition Over a Range of Supported Ru Catalysts

An aqueous hydrazine solution (2.5 liters, [N2H4]=3.8% w/v) was recirculated through a flooded bed of Ru catalyst (catalyst bed volume typically 500 ml) at a flow rate through the catalyst bed of 130 ml/min. Samples of the solution (1 to 5 ml) were removed at regular time intervals and the concentration of hydrazine was determined. The results are summarised below

| Catalyst | Mass/ | Solution | % [N2H4] after Recirculation | | | | |
|---|---|---|---|---|---|---|---|
| Times (min) | g | Temp/° C. | 0 | 10 | 30 | 50 | 70 |
| 2.5% Ru/SiO2-Al2O3 | 230 | 50 | 3.80 | 2.03 | 0.55 | 0.15 | 0.00 |
| 2.5% Ru/SiO2 | 200 | 50 | 3.80 | 1.94 | 0.32 | 0.05 | 0.00 |
| 2.5% Ru/C | | 30 | 3.80 | 1.72 | 0.36 | 0.00 | 0.00 |

The invention claimed is:
1. A process for preparing a catalyst active for the fluid bed acetoxylation of ethylene to produce vinyl acetate, which process comprises the steps of:
   (a) impregnating microspheroidal silica support particles by the incipient wetness technique with an aqueous solution of palladium and gold compounds, whilst agitating the support particles;
   (b) drying the impregnated support particles produced in step (a) whilst agitating the impregnated support particles;
   (c) reducing the palladium and gold compounds of the impregnated support particles produced in step (b) to respective metals by adding the dried, impregnated support particles to an aqueous solution of hydrazine, whilst stirring, to form a slurry;
   (d) filtering the slurry produced in step (c) to remove the excess reduction solution;
   (e) washing the filter cake/slurry produced in step (d) with water and removing excess water to form a cake;
   (f) impregnating the cake produced in step (e) with one or more salts of Group I, Group II, lanthanide and transition metals by blending the cake produced in step (e) with one or more solid salts of Group I, Group II, lanthanide and transition metals; and
   (g) drying the impregnated cake produced in step (f) whilst agitating the impregnated cake to form free-flowing catalyst particles.

2. A process according to claim 1, wherein in step (a) the microspheroidal silica support particles are impregnated by the incipient wetness technique whilst continuously agitating the support particles.

3. A process according to claim 1 in which the palladium compound is selected from the group consisting of palladium acetate, sulphate, nitrate, chloride, halogen-containing palladium compounds and Group I and Group II salts of halogen-containing palladium compounds.

4. A process according to claim 1 wherein the gold compound is selected from the group consisting of gold chloride, dimethyl gold acetate, barium acetoaurate, gold acetate, tetrachloroauric acid and Group I and II salts of tetrachloroauric acid.

5. A process according to claim 1 in which step (b) comprises agitating the impregnated support particles whilst applying external heat at a temperature in the range 50 to 200° C.

6. A process according to claim 1 wherein in step (g) the cake is dried at a temperature in the range from 60 to 150° C.

7. A process according to claim 1 in which the microspheroidal support particles are selected from the group consisting of silica, alumina, zirconia and mixtures thereof.

8. A process as according to claim 1 in which step (a) and step (b) are performed in the same apparatus, said apparatus comprising a vessel being capable of being heated and agitated simultaneously.

9. A process according to claim 8 wherein step (a) and step (b) are performed in an agitated blender.

10. A process according to 1 in which step (f) and step (g) are performed in the same apparatus, said apparatus comprising a blender.

11. A process according to claim 1 wherein the concentration of hydrazine in the aqueous solution is 1 to 20 wt %.

12. A process according to claim 11 wherein the concentration of hydrazine is 3 to 20 wt %.

13. A process according to claim 1 wherein the aqueous solution of hydrazine has not been rendered alkaline by an alkali metal hydroxide.

14. A process according to claim 1 comprising preparing a catalyst containing at least about 0.1 wt % to about 5 wt % palladium and about 0.1 to about 3 wt % gold.

15. A process according to claim 1 in which unreacted hydrazine washed from the material after the reduction step is decomposed in the absence of an oxidant over a supported ruthenium catalyst to nitrogen and ammonia.

16. A process for impregnating microspheroidal catalyst support particles with at least one compound of a catalytically active group VIII noble metal, which process comprises the steps of:
   (a') impregnating the microspheroidal support particles by the incipient wetness technique with an aqueous solution of the at least one catalytically active group VIII noble metal, whilst agitating the support particles; and
   (b') drying the impregnated support particles produced in step (a') whilst agitating the impregnated support particles;
   wherein steps (a') and (b') are performed in the same apparatus, said apparatus comprising an agitated blender.

17. A process according to claim 16 in which step (b') comprises agitating the impregnated support particles whilst applying external heat at a temperature in the range 50 to 200° C.

18. A process according to claim 16 in which the microspheroidal support particles are selected from the group consisting of silica, alumina, zirconia and mixtures thereof.

19. A process according to claim 16 in which the at least one catalytically active group VIII noble metal comprises palladium.

20. A process according to claim 16 further comprising a step (c'), which comprises, contacting the impregnated support particles with a reducing agent to convert the at least one compound to its respective metal.

21. A process according to claim 20 wherein the impregnated support particles are added to a solution of a reducing agent active for reduction of the at least one metal compound to its respective metal whilst stirring.

22. A process according to claim 20 wherein the reducing agent comprises an aqueous solution of hydrazine.

23. A process according to claim 22 wherein the concentration of hydrazine in the aqueous solution is 1 to 20 wt %.

24. A process according to claim 23 wherein the concentration of hydrazine is 3 to 20 wt %.

25. A process according to claim 20 further comprising a step (d') wherein the support particles are further impregnated with one or more salts of Group I, Group II, lanthanide and transition metals, by blending the particles with one or more solid salts of Group I, Group II, lanthanide and transition metals in the presence of a solvent for the salt in which the solvent is contained within the pore volume of the catalyst support particle.

26. A process according to claim 25 wherein the solvent is water.

27. A process according to claim 25 which further comprises a step (e') wherein the impregnated particles are dried at a temperature in the range from 60° C. to 150° C.

28. A process according to claim 16 in which the at least one compound of a catalytically active metal impregnated in the support comprises palladium and gold compounds.

29. A process for impregnating porous microspheroidal particles with one or more salts of Group I, Group II, lanthanide and transition metals which process comprises blending the particles with one or more solid salts of Group I, Group II, lanthanide and transition metals in the presence of a solvent for the salt in which the solvent is contained within the pore volume of the support particle.

30. A process according to claim 29 wherein the solvent is water.

31. A process according to claim 29 which further comprises the step of drying the impregnated particles at a temperature in the range from 60° C. to 150° C.

32. A process according to claim 29 wherein the blending is performed in a blender.

33. A process according to claim 29 in which the microspheroidal support particles are selected from the group consisting of silica, alumina, zirconia and mixtures thereof.

* * * * *